United States Patent Office 3,702,229
Patented Nov. 7, 1972

3,702,229
PRINTING OF ANIONIC DYES ON POLYCARBON-AMIDES OF BIS(PARA - AMINOCYCLOHEXYL) METHANE AND DODECANEDIOIC ACID
Eugene E. Campana, Norwood, N.J., assignor to Ciba-Geigy Corporation, Greenburgh, N.Y.
No Drawing. Filed Dec. 29, 1970, Ser. No. 102,517
Int. Cl. D06p 5/04
U.S. Cl. 8—62                                      6 Claims

ABSTRACT OF THE DISCLOSURE

Processes are provided for the printing substrates of silk-like linear, high molecular weight fibers containing at least 90% repeating units of the formula

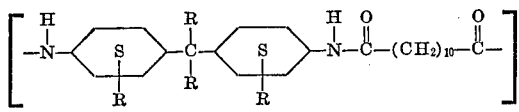

wherein R is the same or different member of the class consisting of hydrogen and methyl with selected acid dyestuffs. By the use of selected organic carriers and dyestuffs used in conjunction with thiourea, excellent prints can be obtained. The printed substrates may be steam developed.

---

The present invention relates to printing silk-like substrates of high molecular weight linear polyamide fibers containing at least 90% of the repeating unit

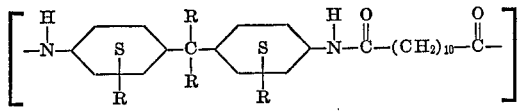

wherein R is the same or different member of the class consisting of hydrogen and methyl. At least 40% by weight of the diamino constituent of the repeating units is of the trans, trans stereoisomeric configuration.

The manufacture of these fibers as well as the above-discussed structure is detailed in U.S. Pat. 3,393,210 to Speck, which specification is incorporated by reference herein.

As exemplary of these materials is the polyamide polycondensate of 4,4'-diaminodicyclohexylmethane with dodecanedioic acid. Such material is commercially available from Du Pont, depending on finish, denier, etc., as Nylon Types 472 (trademarked as Qiana®) and 473. The latter material has a silk-like handle, a density of 1.04 and a crystallinity similar to polyester fibers as reported by A. Liddiard, Review of Progress in Coloration, vol. 1, page 64, June '67–September '69.

As disclosed in Du Pont's bulletin on "Dyeing and Finishing of Type 472 Nylon," the printing of this fiber to date has been carried out with disperse dyes. However, these dyes leave much to be desired in terms of heat sublimation, light and wash fastness, as well as brilliance of shade.

Accordingly, it was a primary objective of the present inventor to achieve printing of Type 472 nylon with the traditionally fast classes of dyestuffs.

This objective could not be obtained by the use of conventional polyamide, e.g. nylon-6 or 66 printing techniques.

The above objective was finally realized by the use of selected dyestuffs and carriers used in conjunction with thiorurea. After the paste is dried, the color is developed by steaming at temperatures between 212 and 265° F. and pressures between 0 and 30 p.s.i.g.

With respect to suitable carriers may be mentioned

| Trade name | Generic or chemical structure |
|---|---|
| Santophene | 2-benzyl-4-chlorophenol. |
| Tanalid 004 | Paraphenyl phenol. |
| Tanavol | Trichlorobenzene. |
| Tanadel IM | Butyl benzoate. |
| Dowanol EPH | Ethylene glycol phenyl ether. |
| Benzoic acid | $C_6H_5COOH$. |
| Kromfax | $HOCH_2CH_2SCH_2CH_2OH$ (Thiodiglycol). |
| Phenol | $C_6H_5OH$. |
| Benzophenone | $C_6H_5COC_6H_5$. |
| Ethyl benzoate | $C_6H_5COOC_2H_5$. |
| Butyl benzoate | $C_6H_5COO(CH_2)_3CH_3$. |
| Benzyl benzoate | $C_6H_5CH_2OCOC_6H_5$. |
| Phenyl benzoate | $C_6H_5COOC_6H_5$. |
| Dowacide 31 | 4-Chloro-2-phenyl phenol and 6-chloro-2-phenyl phenol. |
| Resorcinol | $C_6H_4(OH)_2$. |
| Benzyl alcohol | $C_6H_5CH_2OH$. |
| Irgasolvent SBA | Composed of: 21.44% benzyl alcohol; 67.77% chlorophenoxyethanol, of which 56.09% is p-chlorophenoxyethanol; 4.7% diethylene glycol ethers; 0.78% free phenols. |
| Salicylic acid | $C_6H_4(OH)(COOH)$. |
| Acetophenone | $C_6H_5COCH_3$. |
| Benzaldehyde | $C_6H_5CHO$. |
| Irgasolvent PAC | p - Chlorophenoxyphenol (other isomers may be present in minor amounts). | preferred among these are 2-benzyl-4-chlorophenol, ethylene glycol phenyl ether, Dowacide 31, resorcinol, Irgasolvent SBA and Irgasolvent PAC. Preferred amounts of carrier range from 5.0 to 100 g./l. printing paste with 15 to 25 g./l. being most preferred.

Suitable dyes include anionic dyes of the groups azo acid and anthraquinone dyes, such as Acid Red 151 (C.I. 26900)—

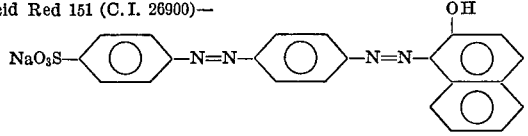

Acid Blue 25—

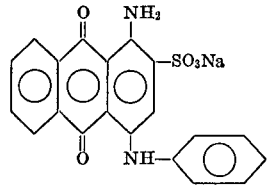

direct dyes and 2:1 complex premetalized azo dyes.

Dye strengths of the print paste range from 0.01 to 150 g./l. print paste, based on desired strength.

Thiourea is employed in amounts of 5 to 200 g./l. print paste. Any conventional thickener can be employed to achieve the desired viscosity.

The dyestuffs are added to the thiourea and carrier to form a paste. To the paste is added the desired quantity of water, which dissolves the paste. Thickener is then added to produce the desired viscosity. Other additives, such as thiodigylcol may be added to the paste.

The paste may be applied by any conventional printing technique, e.g. silk screen, engraved roller and offset printing as well as pad printing. The print is then dried by any conventional means and is then steamed to develop the color.

The following specific embodiments are merely exemplary and are not limiting. All quantities are expressed in grams/liter finished paste unless otherwise stated.

EXAMPLE 1

Du Pont nylon Type 472 is silk screen printed with the following paste:

10 g./l. Acid Red 151 is added to 25 g./l. Irgasolvent PAC and 100 g./l. thiourea. This mixture is then pasted and is dissolved in 840 g./l. of water. Then 25 g./l. dry basis modified locus bean thickener (as an aqueous suspension) is added to achieve the desired viscosity. The print is dried and steam set with dry steam at 20 p.s.i.g. and 265° F. A bright, strong red print is achieved, with good light fastness, wash and crock fastness.

EXAMPLE 2

Du Pont nylon Type 472 is printed by an engraved roller with the following paste:

10 g./l. Acid Blue 25 (C.I. 62055) is added to 25 g./l. 2-benzyl-4-chlorophenol. 100 g./l. thiourea is added to the resultant paste. The paste is dissolved in 475 g./l. water and 50 g./l. modified locus bean thickener (5% dispersion—25 g./l. dry basis).

The print was dried and developed as in Example 1. Excellent brightness, strength and fastness was achieved.

EXAMPLE 3

The procedure of Example 2 was repeated, replacing 2-benzyl-4-chlorophenol with ethylene glycol phenyl ether, resorcinol, Dowacide 31 and Irgasolvent SBA, respectively, all giving the excellent results as in Example 2.

I claim:

1. A process for printing a textile substrate of linear high molecular weight, silk-like polyamide fibers, wherein recurring polyamide linkages are an integral part of the polymer chain and at least 90% by weight of the repeating units of said polyamide are of the formula:

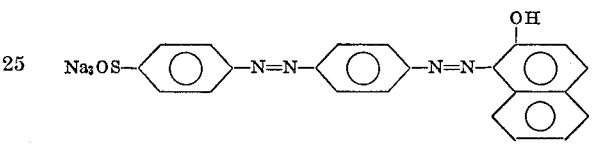

wherein R is the same or different member of the class consisting of hydrogen or methyl, which comprises printing said fiber with an aqueous printing paste containing (a) as a carrier 2-benzyl-4-chlorophenol or 4-chloro-2-phenyl phenol and 6-chloro-2-phenyl phenol in an amount effective to assist development of the color on the fiber, (b) an anionic dyestuff selected from the group consisting of acid dyestuffs, 2:1 premetallized azo dyestuffs and direct dystuffs, (c) 5 to 200 g./l. based on the finished part of thiourea, and (d) thickener;

drying and steam developing the print at temperatures between about 212° and about 265° F. and pressure of between about 0 and about 30 p.s.i.g.

2. The process according to claim 1 wherein all R groups on the repeating polyamide units are H.

3. The process according to claim 1 wherein the carrier is 2-benzyl-4-chlorophenol.

4. The process according to claim 1 wherein the carrier is employed in amounts of 5 to 100 g./l. finished paste and thiourea is employed in amounts of 5 to 200 g./l. finished paste.

5. The process according to claim 4 wherein the dyestuff is

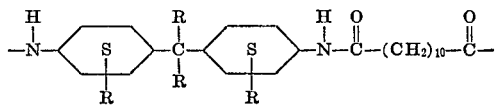

6. The process of claim 1 wherein said dyestuff is an acid dyestuff.

References Cited

UNITED STATES PATENTS 3,510,891   5/1970   Luongo _____ 8—173

OTHER REFERENCES

Lynn, Advances in Textile Processes, vol. 1, pp. 360–363, pub. by Textile Book Pub. Inc., New York, N.Y.

Diserens, Chemical Technology of Dyeing and Printing, pp. 275–276, pub. 1951 by Reinhold Pub. Corp., New York, N.Y.

DONALD LEVY, Primary Examiner

U.S. Cl. X.R.

8—173